(12) United States Patent
Ahmed

(10) Patent No.: US 10,098,361 B2
(45) Date of Patent: Oct. 16, 2018

(54) SMOKE PRODUCING DEVICE AND METHOD FOR OUTDOOR COOKERS

(71) Applicant: W.C. Bradley Co., Columbus, GA (US)

(72) Inventor: Mallik Ahmed, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 668 days.

(21) Appl. No.: 14/148,282

(22) Filed: Jan. 6, 2014

(65) Prior Publication Data

US 2014/0216274 A1    Aug. 7, 2014

Related U.S. Application Data

(60) Provisional application No. 61/749,043, filed on Jan. 4, 2013.

(51) Int. Cl.
*A23B 4/052*    (2006.01)

(52) U.S. Cl.
CPC .................... *A23B 4/0523* (2013.01)

(58) Field of Classification Search
CPC ....... A23B 4/044; A23B 4/052; A23B 4/0523; A23B 4/0526
USPC .......................................... 99/482, 481, 467
See application file for complete search history.

(56) References Cited

U.S. PATENT DOCUMENTS

| | | | |
|---|---|---|---|
| 2,246,804 A | 6/1941 | Lipschutz | |
| 3,788,301 A * | 1/1974 | Terry | A23B 4/0523 126/59.5 |
| 4,357,903 A | 11/1982 | Moss et al. | |
| 4,697,506 A | 10/1987 | Ducate, Jr. | |
| 4,770,157 A | 9/1988 | Shepherd et al. | |
| 4,779,525 A * | 10/1988 | Gaines | A23B 4/0523 126/25 R |
| 5,048,406 A * | 9/1991 | Cofer | A23B 4/0523 126/25 R |
| 5,167,183 A | 12/1992 | Schlosser et al. | |
| 5,193,445 A * | 3/1993 | Ferguson | A23B 4/044 206/524.6 |
| 6,019,035 A | 2/2000 | Jonas et al. | |
| 6,059,849 A | 5/2000 | Lewis | |
| 6,102,028 A | 8/2000 | Schlosser et al. | |
| 6,257,130 B1 | 7/2001 | Schlosser | |
| 6,701,829 B2 | 3/2004 | Farrow | |
| 6,705,213 B1 * | 3/2004 | Thomas | A47J 37/0786 99/467 |
| 6,971,305 B1 * | 12/2005 | Thomas | A23B 4/0523 99/467 |

(Continued)

FOREIGN PATENT DOCUMENTS

| | | |
|---|---|---|
| AU | 2009100966 | 9/2008 |
| CA | 1223770 | 7/1987 |

(Continued)

*Primary Examiner* — Ibrahime A Abraham
*Assistant Examiner* — Biniam Asmelash
(74) *Attorney, Agent, or Firm* — David G. Woodral; GableGotwals

(57) ABSTRACT

A device has an inner wall with a plurality of flow openings and defining a smoking chamber. A solid outer wall surrounds the inner wall to define a flow gap between the inner wall and outer wall. A top cover extends to enclose the smoking chamber and the flow gap from the top. Openings may be provided for air flow into and out of the device.

8 Claims, 7 Drawing Sheets

(56) References Cited

U.S. PATENT DOCUMENTS

| | | |
|---|---|---|
| 7,866,256 B2 | 1/2011 | Frigo |
| 8,826,806 B2 * | 9/2014 | Difante .................. A47J 27/18 |
| | | 210/483 |
| 2004/0025714 A1 | 2/2004 | Neal et al. |
| 2008/0168979 A1 | 7/2008 | Goehring et al. |
| 2008/0223224 A1 * | 9/2008 | Martin .................. A23B 4/048 |
| | | 99/482 |
| 2009/0173238 A1 * | 7/2009 | Martinez ................ A47J 33/00 |
| | | 99/352 |
| 2014/0261015 A1 * | 9/2014 | Nelson .................. A23B 4/052 |
| | | 99/467 |

FOREIGN PATENT DOCUMENTS

| | | |
|---|---|---|
| CA | 2086154 | 6/1994 |
| GB | GB2456901 B | 2/2012 |
| WO | PCT/US2014/010357 | 5/2014 |

* cited by examiner

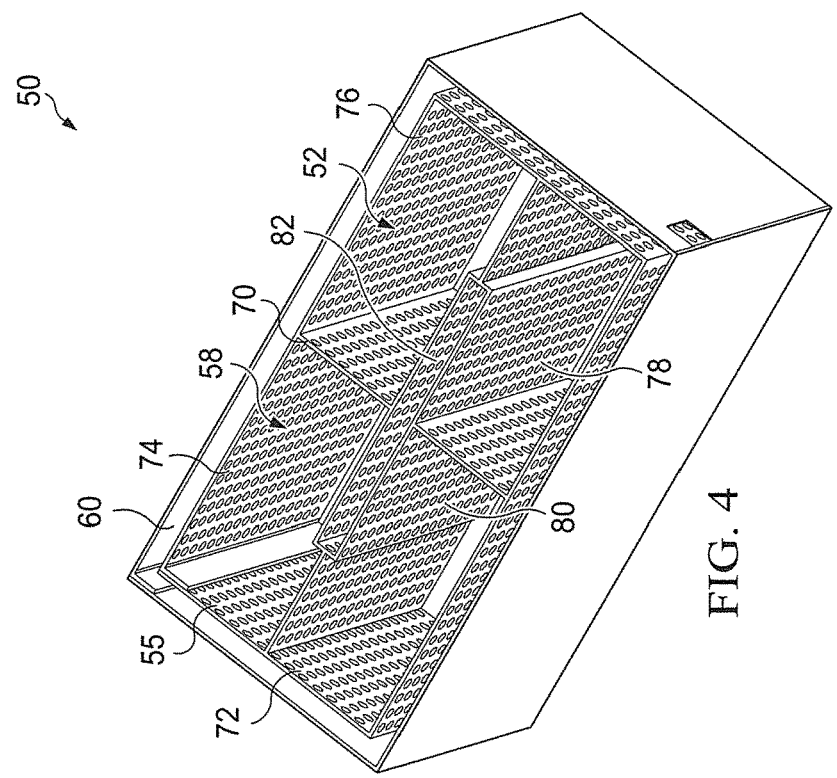
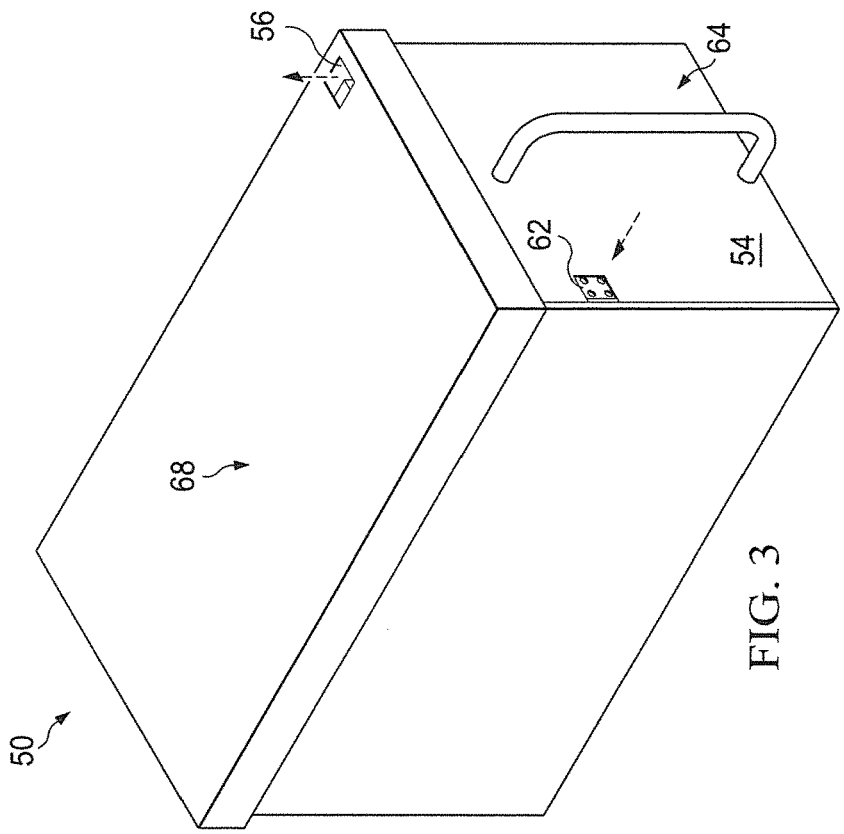

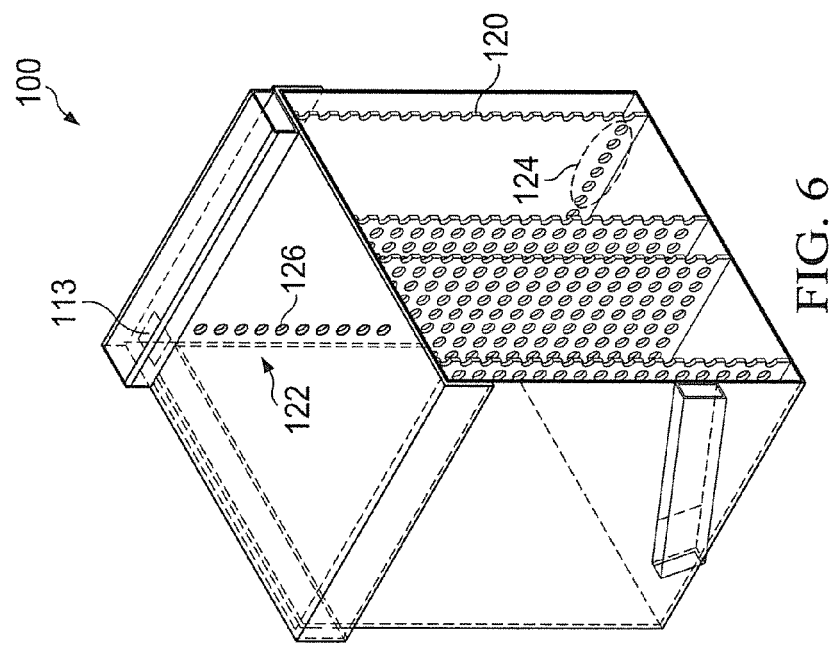
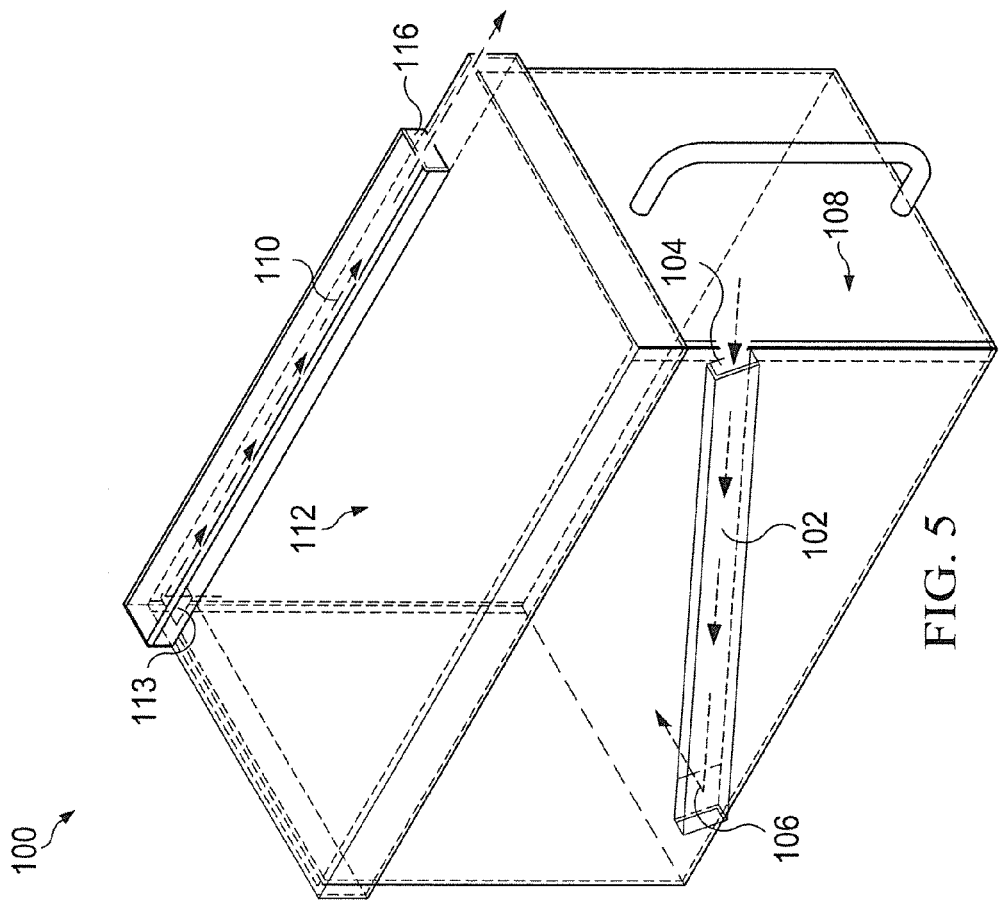

SMOKE PRODUCING DEVICE AND METHOD FOR OUTDOOR COOKERS

CROSS-REFERENCE TO RELATED CASES

This application claims the benefit of U.S. provisional patent application Ser. No. 61/749,043 filed on Jan. 4, 2013, and incorporates such provisional application by reference into this disclosure as if fully set out at this point.

FIELD OF THE INVENTION

The present invention relates to devices and methods for generating wood smoke in outdoor cookers for adding a wood smoke flavor to the food.

BACKGROUND OF THE INVENTION

With the development of gas and electric outdoor cooking appliances in the 1980's, various devices have been constructed for the purpose of generating wood smoke in the cooker for adding a wood smoke flavor to the food. Such devices typically comprise perforated containers for holding woodchips or pellets. The perforated container can be an integrated component of the cooking apparatus or it can be an independent accessory which will be placed in the cooker on or near the heat source.

Unfortunately, the smoke generating devices heretofore known in art have had numerous shortcomings and disadvantages. Many of the devices heretofore known in the art either have not been able to produce a sufficient amount of smoke or have not been able to prevent the wood fuel from bursting into flames. When the combustion regime in the smoking device changes from smoke production to flame production, the device no longer produces sufficient smoke for flavoring food. Moreover, the flaming of the wood fuel interferes with the cooking process and can burn the food.

In many gas or electric cookers, the design of the gas firebox or electric heating chamber of the outdoor cooker is such that the smoker container must be placed on or in very close proximity to the heat source. However, even in the case of devices that have a limited number of air openings to allow placement in close proximity to the heat source, the prior art devices have not been able to consistently prevent the wood fuel from producing flames. Moreover, the prior art devices have been particularly prone to severe flare-ups if suddenly exposed to significant excess air when, for example, the user opens the lid or cover of the cooker to check on or remove the food.

Another common deficiency of the prior art smoking devices is that the device will stop producing smoke even though the woodchips or pellets contained therein have not been entirely consumed. This occurs because the layer of fuel closest to the heat source is quickly converted by the burning process to a layer of charcoal and/or ash material which acts as an insulating, air flow barrier between the heat source and the remaining layers of fuel.

In addition, for these same reasons, there is also very little ability in the prior art smoking devices to extend the smoke release time to any significant degree by stacking more chips or pellets in the device. Rather, to extend the smoking time to some degree, it has been necessary in the prior art devices to soak the chips or pellets in water prior to use, which is time consuming and inconvenient. Nor do these prior art devices provide the ability to vary the intensity of the smoke produced over a given smoking time.

SUMMARY OF THE INVENTION

The invention of the present disclosure, in one aspect thereof, comprises a device having an inner wall having a plurality of flow openings and defining a smoking chamber. A solid outer wall surrounds the inner wall to define a flow gap between the inner wall and outer wall. A top cover extends to enclose the smoking chamber and the flow gap from the top. The top cover has a solid portion covering the smoking chamber and a perforated portion defining a plurality of openings over the flow gap. A bottom wall extends to enclose the smoking chamber and flow gap from the bottom, the bottom wall providing a plurality of openings under the flow gap.

In some embodiments, the bottom wall provides a plurality of openings under the smoking chamber. The outer wall and the inner wall may be cylindrical or rectilinear in shape. Some embodiments further comprises a central conduit in fluid communication with a central air opening in the bottom wall and extending into the smoking chamber, the central conduit defining a plurality of openings to the smoking chamber. In various embodiments, the plurality of flow openings may range in size from about 0.06 inches to about 0.2 inches and a center to center distance between the plurality of flow openings may range from about 0.125 inches to about 0.5 inches.

The invention of the present disclosure, in another aspect thereof comprises a device having a substantially solid outside box defining an interior chamber with an open top, and defining a plurality of flow openings on a bottom thereof. A smoking chamber is located inside the box such that a flow gap is defined between walls of the smoking chamber and the outside box, the walls of the smoking chamber defining a plurality of flow openings. A lid is fitted to the outside box and defines a plurality of flow openings over the flow gap.

In some embodiments, the flow openings on the bottom of the outside box are situated only under the flow gap. In other embodiments, the flow openings on the bottom of the outside box are situation under the flow gap and the smoking chamber. The device may also include a central conduit in fluid communication with at least one flow opening in the bottom of the outside box and extending into the smoking chamber, the central conduit defining a plurality of openings to the smoking chamber. The smoking chamber may be further divided into a plurality of interior compartments by walls defining flow openings therein, each of the interior compartments abutting the flow gap and the central conduit and in fluid communication with at least one adjacent compartment.

The invention of the present disclosure, in another aspect thereof, comprises a device having a substantially solid outside box defining an interior chamber with an open top, and defining a single air intake opening on a side thereof. The device includes a smoking chamber corresponding to a shape of the outer box so as to define a flow gap between the two, the smoking chamber having walls defining air flow openings and further defining a plurality of compartments within the smoking box, each compartment abutting at least a portion of the defined flow gap, and each of the compartments in fluid communication with adjacent compartments. A lid is provided for fitting to the box and covering the box, flow gap, and smoking chamber compartments; the lid defines a smoke discharge opening.

In some embodiments, the plurality of flow openings range in size from about 0.06 inches to about 0.2 inches. A center to center distance between the plurality of flow openings may range from about 0.125 inches to about 0.5 inches.

The device may include an inlet air tube in fluid communication with the single air intake opening and sloping downward into the flow gap inside the outside box. In addition or instead, the device may include a smoke discharge conduit in fluid communication with the smoke discharge opening for moving exhaust smoke away from the discharge opening.

The device may comprise a central channel in fluid communication with each of the plurality of compartments of the smoking chamber. In some embodiments, each of the plurality of compartments has a floor of a different height. A floor of a first, lowest height may be defined by a floor of the outside box and be located in a compartment of the smoking chamber closest to the air intake opening. A floor of a first lowest height may be in a compartment nearest the air intake opening, and floors of sequentially adjacent compartments are at successively increasing heights.

Further aspects, features, and advantages of the present invention will be apparent to those of ordinary skill in the art upon examining the accompanying drawings and upon reading the following detailed description of the preferred embodiments.

BRIEF DESCRIPTION OF THE DRAWINGS

FIG. 3 is perspective view of an alternative embodiment 50 of the inventive smoke producing device.

FIG. 4 is a top perspective view of the inventive device 50 with the top thereof removed.

FIG. 5 is a perspective view of an alternative embodiment 100 of the inventive smoke producing device.

FIG. 6 is cutaway perspective view of the inventive device 100.

DETAILED DESCRIPTION OF THE PREFERRED EMBODIMENTS

Figure 2:
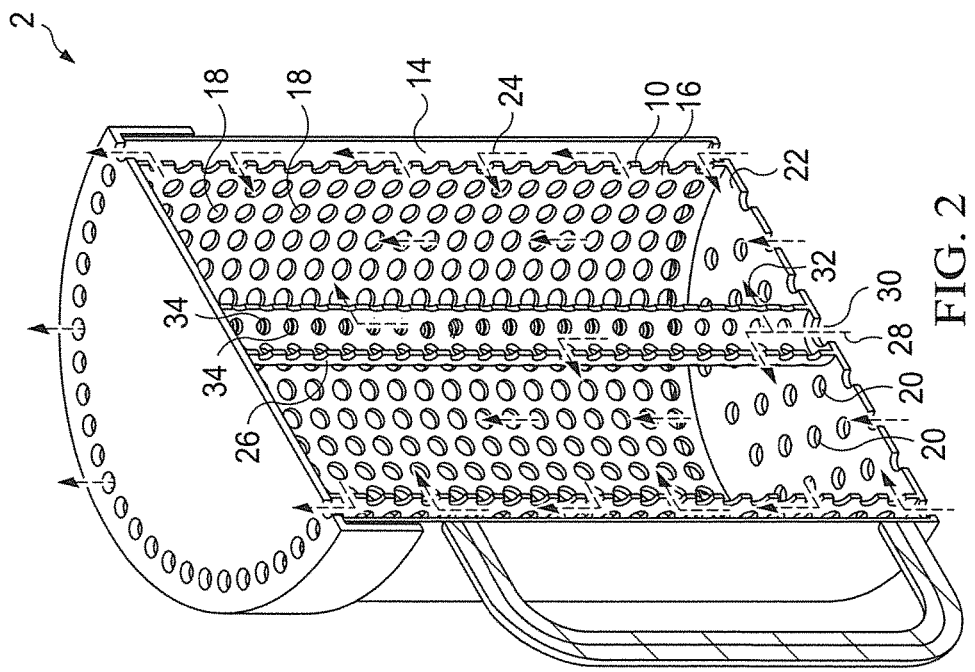
FIG. 2 is a cutaway perspective view of the inventive device 2.

The present disclosure satisfies the needs and alleviates the problems discussed above by providing a smoke producing device and method which (a) produce smoke and prevent flame-up, (b) continue to produce smoke until all of the wood chips, pellets, or other smoke producing fuel is consumed, even if the device is moved away from the heat source, (c) provide the ability to vary the smoking time desired by increasing or decreasing the amount of smoke producing fuel placed in the device, (d) eliminate the need to soak the smoke producing fuel in water prior to use, (e) can operate for a prolonged period of time, even up to 24 or 48 hours, without having to remove and refill the device during the cooking cycle, and (f) provide the ability to produce smoke of any desired intensity, ranging from light smoke to heavy smoke, over any given cooking time.

In one aspect, there is provided a smoking box of a double-walled construction comprising an upwardly-extending, surrounding outer wall which is of substantially solid construction, an upwardly-extending interior wall having perforations formed therethrough on at least two and more preferably at least three or all four of the upwardly-extending sides of the box. The instant smoking box controls the passage of combustion air to the fuel placed within the inner wall and also controls the escape of heated, smoke-laden exhaust air from the box into the cooker. Moreover, the present device accomplishes these results while unexpectedly operating to substantially prevent the release of any flames from the device, even when suddenly exposed to a rush of excess air when the lid or door of the cooker is opened to check on or remove the food.

In another aspect, there is provided a smoke producing device for an outdoor cooker comprising: (a) a container having an upwardly-extending outer wall; (b) a smoking chamber within the container having an upwardly-extending smoking chamber wall which substantially surrounds the smoking chamber, (c) the upwardly-extending smoking chamber wall being positioned in and substantially surrounded by the upwardly-extending outer wall, and (c) an upwardly-extending flow gap which is formed between the smoking chamber wall and the outer wall and which substantially surrounds the smoking chamber. The upwardly-extending smoking chamber wall has a plurality of flow openings formed therethrough on at least two sides of the smoking chamber.

One embodiment of a smoke producing device of the present disclosure preferably has a removable top for placing the smoke producing fuel in the smoking chamber. The top and bottom of the device will each preferably be of either a single wall or a double walled construction. In addition, the horizontal cross-sectional shape of the inventive smoke producing device can be substantially circular, substantially rectangular, substantially square, or of any other symmetrical or non-symmetrical shape. Consequently, as used herein, and unless otherwise specified, any reference to a "side" of the inventive device, or of the smoking chamber, the outer wall, or the interior smoking chamber wall, refers to a right, left, back, or rear segment of the device wall or chamber which can be substantially flat, curved, or of any other shape.

As noted above, the interior, upwardly-extending smoking chamber wall of some embodiments of the smoking device preferably have a plurality of flow openings formed therethrough on at least two sides of the smoking chamber. The upwardly-extending smoking chamber wall preferably has a plurality of air flow openings formed therethrough on at least three sides of the smoking chamber and most preferably has a plurality of air flow openings formed therethrough on all four sides of the smoking chamber. The plurality of openings formed through any given side of the upwardly-extending smoking chamber wall preferably extend across at least most of the width of the side and upwardly along at least most of the height of the side. Most preferably, the apertures formed through the upwardly-extending smoking chamber wall extend upwardly over substantially the entire height of each side of the smoking chamber.

In another aspect, the smoking chamber can include one or more upwardly-extending dividing walls positioned within the upwardly-extending smoking chamber wall which divide the smoking chamber into a plurality of smoking chamber compartments. The wall or walls which divide the smoking chamber into a plurality of upwardly-extending chamber compartments preferably also each have a plurality of air flow openings formed therethrough.

In another aspect, the intake air and/or the exhaust smoke received or discharged by the inventive device can be routed along an elongate flow path via an air intake tube and/or a smoke exhaust tube.

Figure 1:
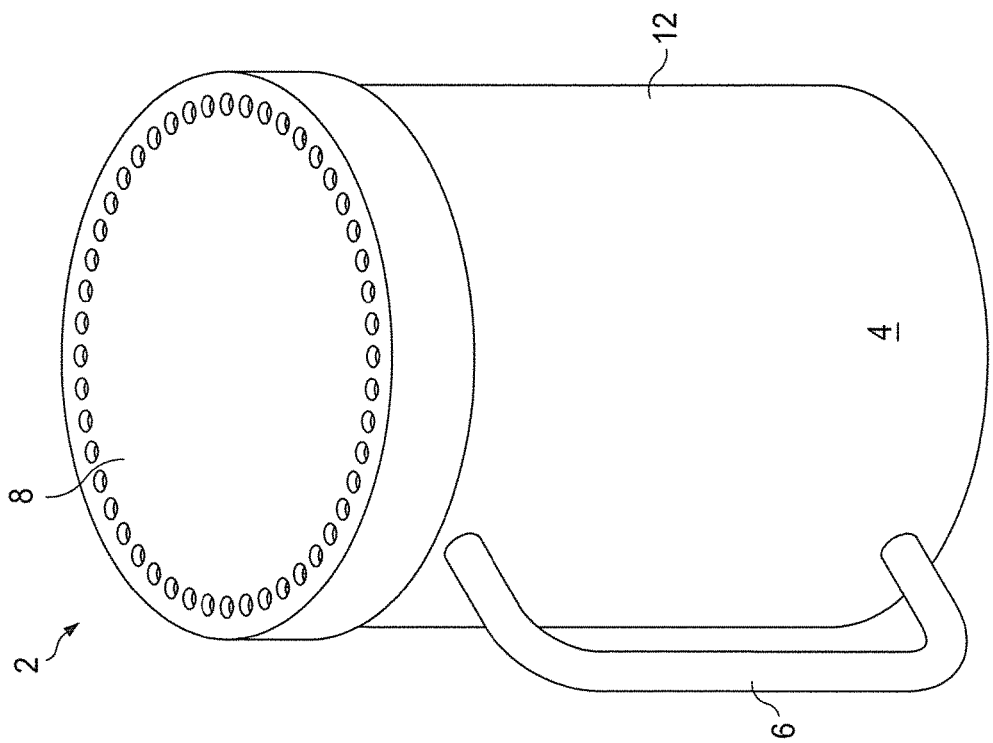
FIG. 1 is a perspective view of an embodiment 2 of the inventive smoke producing device.

One embodiment 2 of the inventive smoke producing device is depicted in FIGS. 1 and 2. The smoking device 2 is a circular (i.e., cylindrical) smoking device which comprises: a cylindrical outer box 4 having an upwardly-extending cylindrical outer wall 12 and a handle 6; a removable circular cover 8 for opening and closing the top of the outer box 4; an upwardly-extending cylindrical smoking chamber wall 10 which is positioned within and surrounded by the upwardly-extending cylindrical outer wall 12 of the box 4; an upwardly-extending cylindrical flow gap 14 which is formed between the outer wall 12 and the interior smoking chamber wall 10; and an upwardly-extending smoking chamber 16 which is formed within and surrounded by the upwardly-extending smoking chamber wall 10 for receiving wood chips, wood pellets, or other fuel suitable for producing smoke for flavoring food.

The upwardly-extending smoking chamber wall 10 of the smoke producing device 2 has numerous flow openings 18 formed therethrough which extend along substantially the entire height and around substantially the entire circumference of the smoking chamber wall 10. Each of the flow openings 18 preferably has a diameter or width which is not more than 0.3 inch and is more preferably in the range of from about 0.06 to about 0.2 inch. The openings 18 are preferably spaced apart from each other at a center-to-center distance which is not more than 0.7 inch and is more preferably in the range of from about 0.125 to about 0.5 inch.

As illustrated in FIG. 2, air inlet openings 20 are formed through the flat circular bottom wall 22 of the smoke producing device 2 such that the air openings 20 are positioned in the bottom of the smoking chamber 16 and also in the bottom end of the flow gap 14. Thus, the combustion air flows directly into the bottom of the smoking chamber 16 and directly into the bottom end of the flow gap 14. The combustion air also flows laterally inward from the upwardly-extending flow gap 14 into the cooking chamber 16 along substantially the entire height of the cooking chamber 16 as illustrated by the air flow arrows 24.

The smoke producing device 2 can also include an optional perforated air intake conduit 26 which extends longitudinally upward through the center of the cooking chamber 16.

The central conduit 26 will preferably be included to promote air contact and circulation over the entire horizontal cross-section of the fuel stack when the diameter of the smoke producing device 2 is at least 2 or at least 3 inches. Combustion air flows into the lower end 28 of the perforated conduit 26 via a central air opening 30 provided through the bottom wall 22 of the outer box 4. As indicated by air flow arrows 32, the intake air received in the lower end 28 of the perforated central conduit 26 is delivered through the perforations 34 of the conduit 26 into the smoking chamber 16 along most or all of the height of the smoking chamber 16.

When using the smoke producing device 2, woodchips, wood pellets, or other smoke producing fuel pieces are stacked inside the smoking chamber 16 on the bottom wall 22. The amount of smoke-producing material stacked in the smoking chamber 10 will be directly proportional to the length of the smoking time desired. With the smoke-producing material placed in the smoking chamber 16, the cover 8 may be placed on the top of the outer box 4 and the smoke producing device 2 will be positioned in the cooker close to the cooking heat source.

As the heat source heats the layer of woodchips, pellets, or other material on the bottom wall 22, combustion air is delivered to the bottom layer of smoke-producing material through the air inlet openings 20 formed through the bottom wall 22. The low oxygen combustion of the lower layer of material produces hot smoke and combustion gases, some of which flow upwardly in the smoking chamber 16 and the remainder of which flows through the smoke chamber wall 10 and into the flow gap 14 where it mixes with the remaining inlet air. As this hot mixture travels upwardly in the flow gap 14, a significant amount of the hot mixture flows back into the combustion chamber and heats the higher layers of the smoke-producing material such that, as each lower layer of material in consumed, the next layer above it reaches combustion temperature and begins to produce smoke.

In this manner described above, all of the fuel placed in the smoking chamber 16 is consumed and, once the combustion process is started, the smoke producing device 2 will continue to produce smoke even if it is moved away from the heat source. Eventually, all of the smoke produced in the smoke producing device 2 is delivered to the upper end of the flow gap 14 and is discharged through the peripheral apertures 38 formed through the top of the cover 8. It can be seen that the cover provides a perforated portion above the flow gap 14 for discharging smoke, but provides a solid portion over the combustion or smoking chamber 16.

In addition to providing a consistent, low oxygen combustion of the fuel which produces smoke without flame-ups, the smoke producing device 2 shown in FIGS. 1 and 2 can produce smoke over a long period of time, without soaking, by simply stacking the wood chips, pellets or other fuel pieces higher in the smoking chamber 16.

Another embodiment 50 of the smoke-producing device is illustrated in FIGS. 3 and 4. The smoke producing device 50 differs from the device shown in FIGS. 1 and 2 in that the device 50 comprises: a solid, rectangular or rectilinear outer box 54; an upwardly-extending, perforated, rectangular interior smoking chamber wall 55 which surrounds a smoking chamber 58; a rectangular, upwardly-extending flow gap 60 which also surrounds the smoking chamber 58; a single air intake opening 62 formed through an upper corner portion of an end wall 64 of the outer box 54; a single smoke discharge opening 56 formed through the removable cover 68 of the device 50 over an upper corner portion of the flow gap 60; and a pair of perpendicular, upwardly-extending perforated partitions 70 and 72 which are positioned in the smoking chamber 58 such that the perpendicular partitions 70 and 72 divide the overall cooking chamber 58 into four upwardly-extending rectangular smoking compartments 74, 76, 78, and 80 of equal size.

The smoke producing device 50 optionally also comprises an upwardly-extending, perforated rectangular central channel 82 which is in fluid communication with each of the smoking compartments 74, 76, 78, and 80. The central channel 82 further facilitates the upward recirculation of hot smoke and combustion gases into the inner portions of the smoking compartments 74, 76, 78, and 80 nearest the center of the smoking chamber 58 and will preferably be included in the device 50 when the device 50 is at least 2 inches or at least 3 inches in width.

When in use, the bottom of the smoke producing device 50 is placed on or near the heat source and the smoke producing device 50 operates in much the same manner as the smoke producing device 2 in that, as each layer of smoke-producing material stacked in each of the smoking compartments 74, 76, 78 and 80 is consumed, the next highest layer reaches combustion temperature and begins smoke production. Moreover, as with the smoke producing device 2, the length of the smoking period provided by the inventive device 50 will be directly proportional to the amount (i.e., height) of the smoke producing material stacked in the smoking chamber 58.

The smoke producing device 50 is particularly well suited for use in cookers wherein the available space within the cooker is limited so that the inventive smoke producing device must be placed on the cooking heat source. The absence of air openings in the bottom and the locations of the air intake and smoke exhaust openings allow the smoke producing device 50 to be placed directly on the heat source without flame-ups.

In addition, the smoke producing device 50 also differs from the smoke producing device 2 in that the intensity of the smoke produced in the inventive device over the smoking period will depend upon the number of smoking compartments 74, 76, 78, and 80 which are used. Thus, the lightest smoke will be produced if the smoke-producing material is only placed in one of the smoking compartments 74, 76, 78, or 80 and the heaviest smoke will be produced over the smoking period if smoke producing material is placed in all of the compartments. In addition, the intensity of the smoke produced during different portions of the smoking period can be varied by placing a lesser amount of smoke-producing material in one or more of the smoking compartments 74, 76, 78, and 80 than in other compartments. When the lesser amount placed in one or more of the compartments is totally consumed, the intensity of the total amount of smoke flowing from the device 50 will be decreased as a result of the fact that smoke is now being produced from a fewer number of compartments.

Another embodiment of a smoke producing device 100 is illustrated in FIGS. 5 and 6. The smoke producing device 100 is substantially similar to smoke producing device 50 except that: (a) the air inlet comprises a downwardly sloping inlet air tube 102 which receives air at its upper inlet end 104 and directs the inlet air to a lower inlet air opening 106 formed in a side corner of the rectangular outer box 108; (b) a smoke discharge conduit 110 is carried on top of a peripheral edge portion of the cover 112 for receiving the smoke product from a corner opening 113 formed through the cover 112 and discharging the smoke product from an outlet 116 at the other end of the cover 112; and (c) one of the internal, upwardly-extending rectangular cooking chamber sidewalls 120 which forms the portion of the flow gap 122 immediately below the smoke discharge opening 113 is mostly a solid wall structure having only a horizontal row of apertures 124 which extend along the lower peripheral edge portion of the wall 120 and an upwardly-extending row of openings 126 (shown in phantom) formed in the upwardly-extending peripheral portions of the wall 120 on each end of the device 100.

Alternatively, the inlet air tube 102 and the smoke discharge conduit 110 can be positioned inside the box 108 in the flow gap 122.

The smoke producing device 100 may be even more robust than the smoke producing device 50 in that, for example, the smoke producing device 50 can be placed directly on a gas burner without flame-ups. Routing the intake air through the downwardly sloping inlet air tube 102 and routing the smoke discharge through the elongate smoke discharge conduit 110 on or near the top of the device 100 ensures that any combustible wood gas which is discharged from the smoke discharge conduit 110 or even from the elevated air intake opening 104 will have been cooled sufficiently that it will not produce flames when released.

Figure 8:
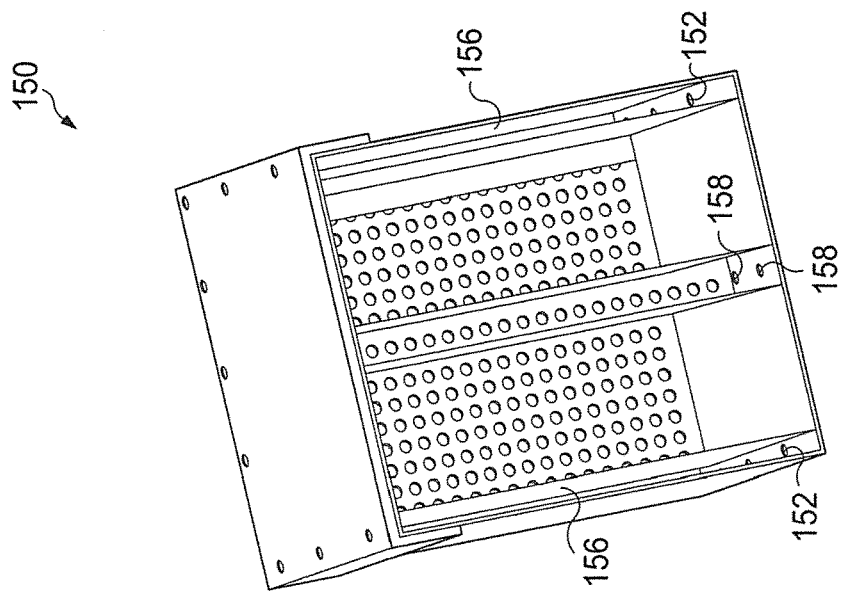
FIG. 8 is a cutaway perspective view of the inventive device 150.
Figure 7:
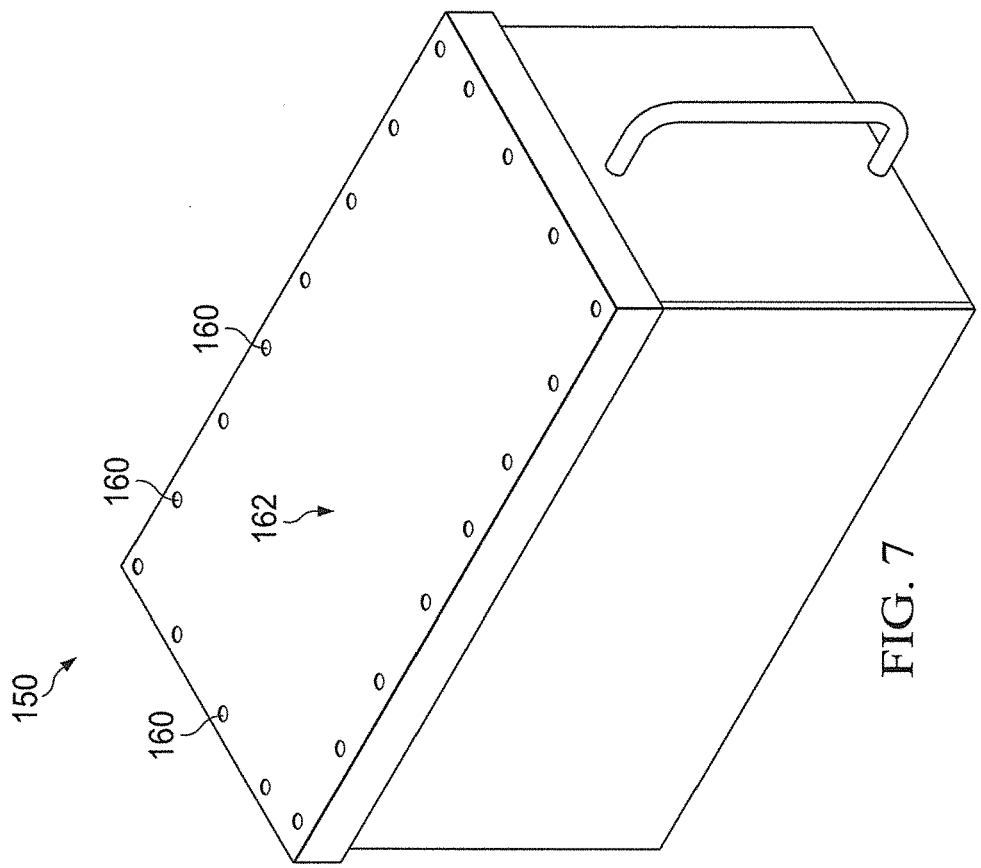
FIG. 7 is a perspective view of an alternative embodiment 150 of the inventive smoke producing device.

Another embodiment 150 of a smoke producing smoke-producing device is illustrated in FIGS. 7 and 8. The smoke producing device 150 is substantially similar to the inventive device 50 except that: (a) the air intake for the device 150 comprises a series of openings 152, formed through and around the entire periphery of the bottom wall 154 of the device 150 beneath the internal flow gap 156; (b) further air intake openings are provided through the bottom wall 154 beneath the central, rectangular, upwardly-extending channel 158; and (c) the smoke discharge openings for the device 150 comprise a series of openings 160 formed through and around the outer peripheral portion of the cover 162 above the internal flow gap 156. Thus, the cover 162 provides a solid portion covering the coming chamber and a perforated portion covering the flow gap 156.

The multiple internal combustion compartments of the smoke producing device 150 provide the same advantages and benefits as achieved by the multiple compartments of the inventive devices 50 and 100. However, as with the smoke producing device 2, the smoke producing device 150 is particularly well suited for use in cookers wherein sufficient internal space is available such that the smoke producing device 150 can be placed near, rather than directly on the cooker heat source.

Figure 10:
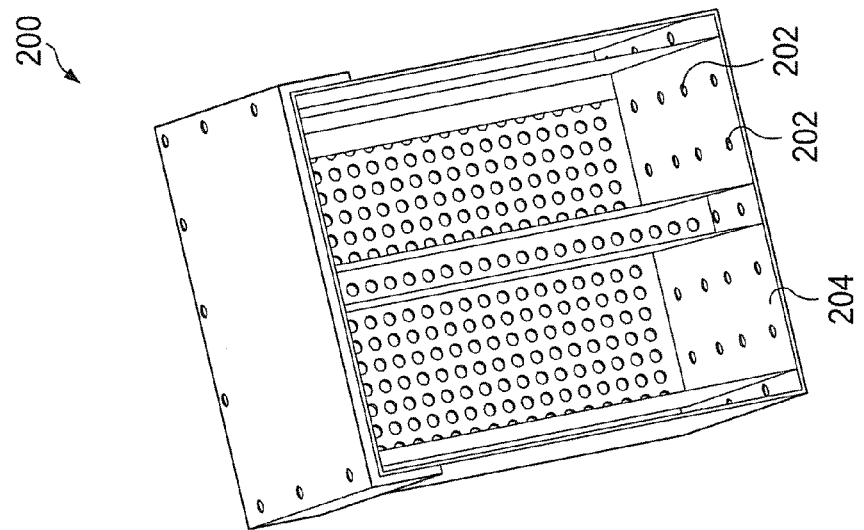
FIG. 10 is a cutaway perspective view of the inventive device 200.
Figure 9:
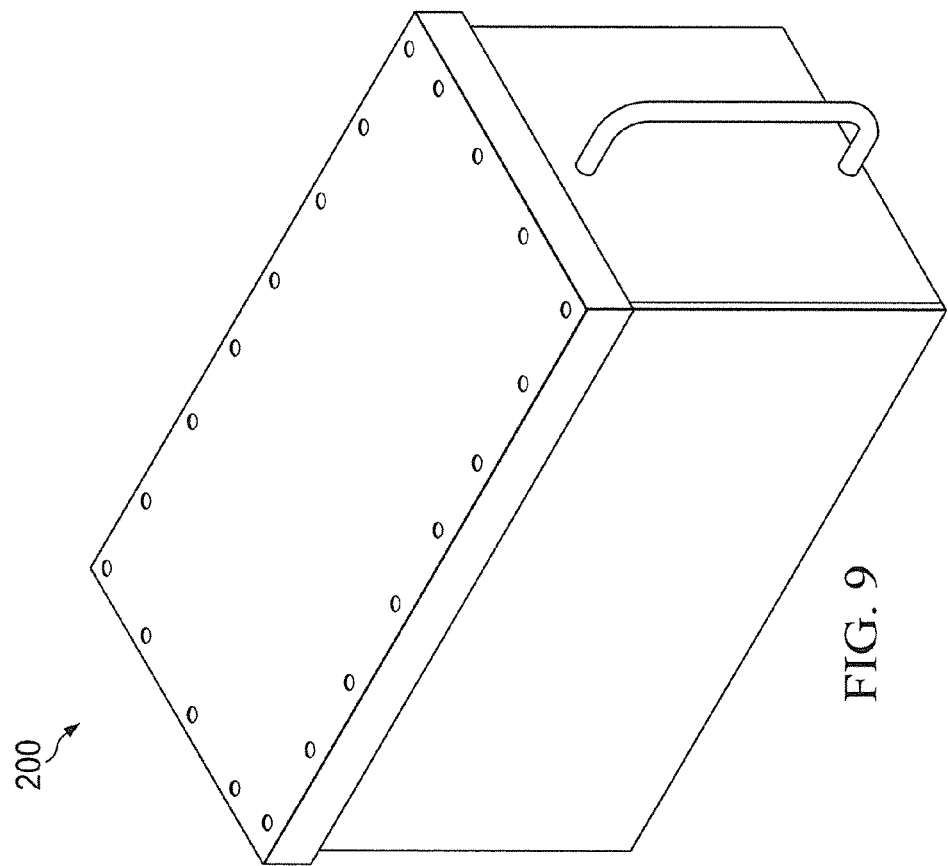
FIG. 9 is a perspective view of an alternative embodiment 200 of the inventive smoke producing device.

Another embodiment of a smoke producing device 200 is illustrated in FIGS. 9 and 10. The smoke producing device 200 is substantially similar to the smoke producing device 150 except that the smoke producing device 200 further comprises additional inlet air openings 202 formed through the bottom wall 204 within the lower ends of the four smoking compartments 74, 76, 78, 80.

Figure 11:
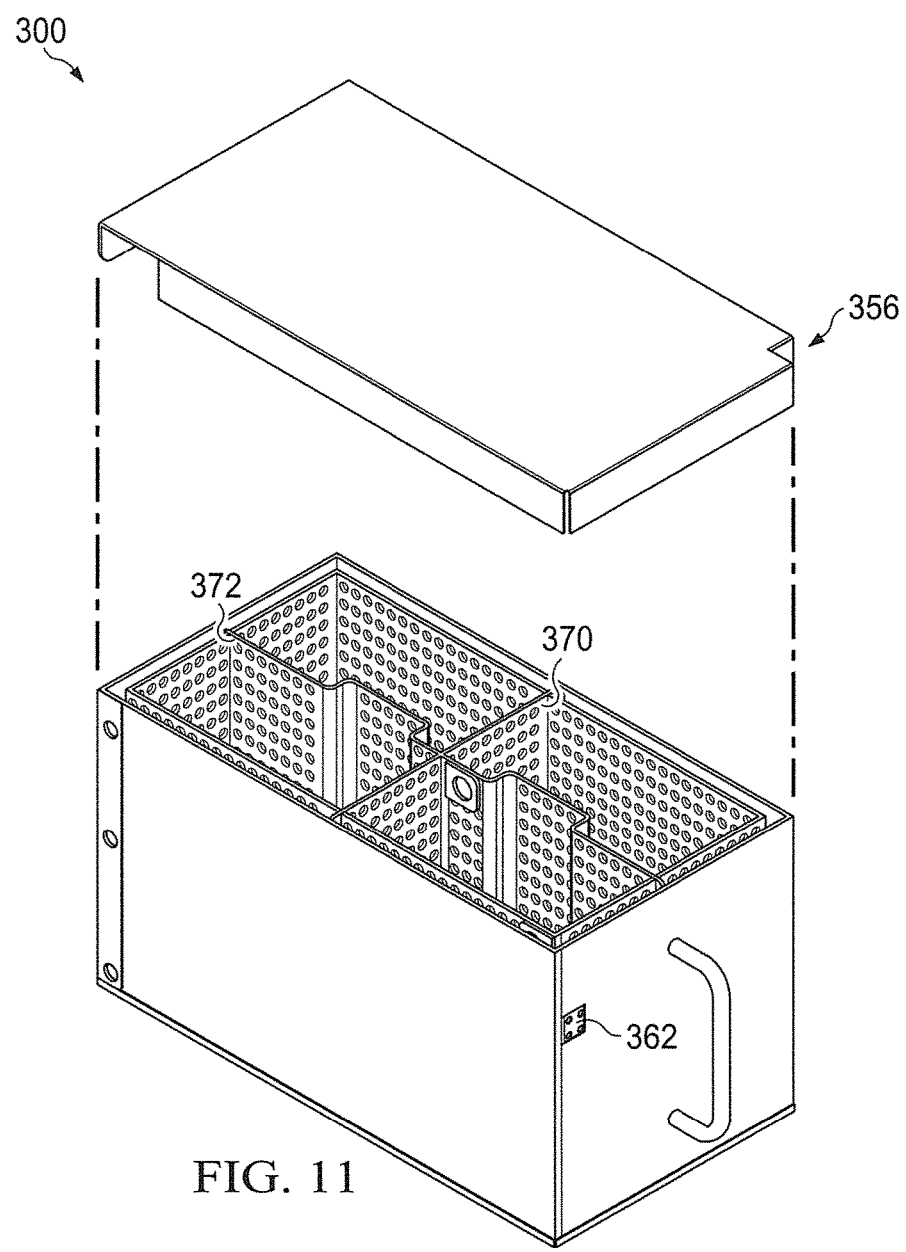
FIG. 11 is a perspective view of an alternative embodiment 300 of the inventive smoke producing device.
Figure 12:
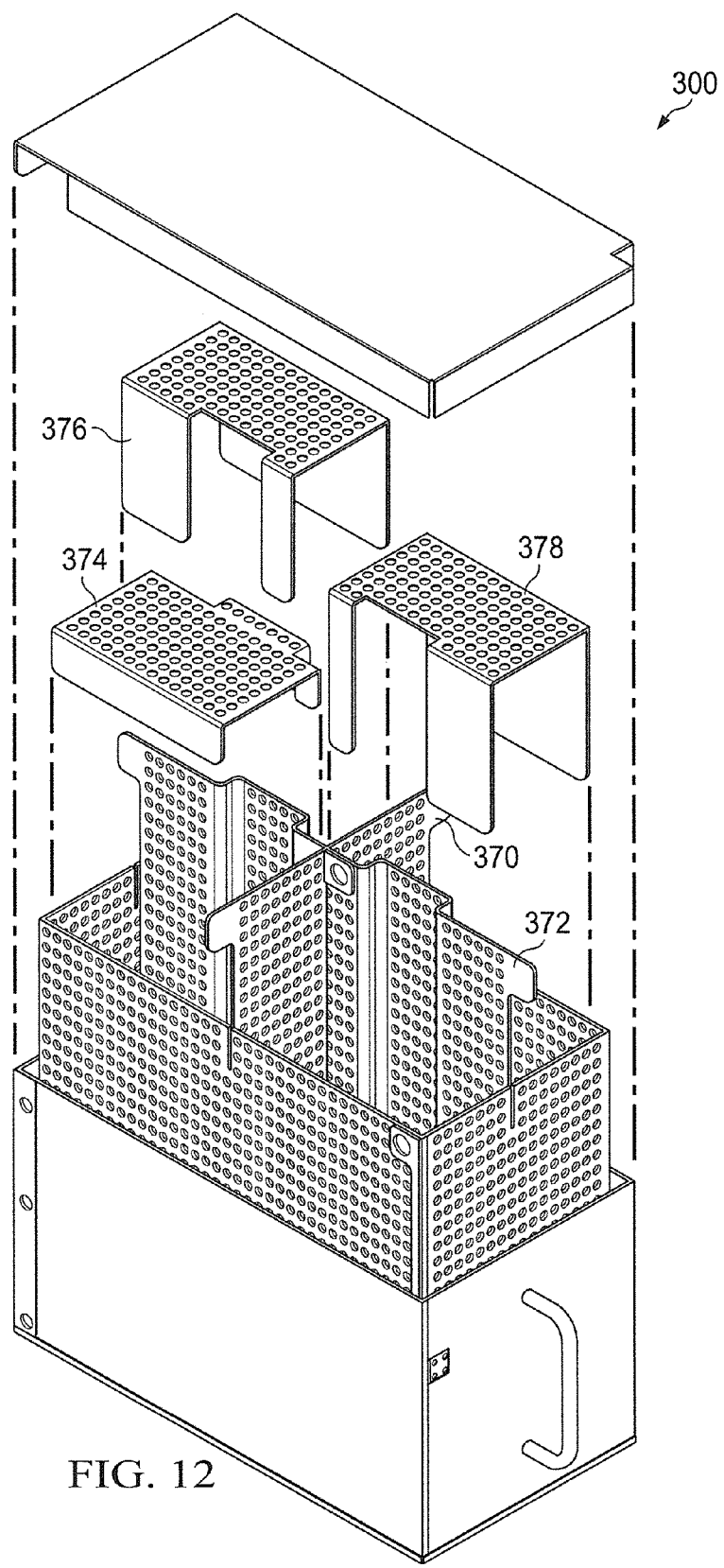
FIG. 12 is an exploded perspective view of the inventive device 300.

Another embodiment of a smoke producing device 300 is illustrated in FIGS. 11 and 12. The smoke producing device 300 is substantially similar to the smoke producing device 50 with an inlet 362 and an outlet 356, except that the smoke producing device 300 does not include the upwardly-extending, perforated rectangular central channel 82 at the intersection of the perpendicular partitions 370 and 372. Added to the smoke producing device 300 are three removable floors, 374, 376, and 378 of successively greater height above the bottom wall of the smoke producing device. When the smoke producing device 300 is placed on or near the heat source ignition will start at the compartment without the floor but will not start at the compartment with the floor of lowest height 374 until the smoke producing material has been consumed up to the level of the floor of 374, at which time the combustion progresses across the perforated surface of the partition 370.

A stair step effect of ignition of the remaining floors 376, 378 will occur in an ordered and timed fashion. Floor 376 will not ignite until the consumption of smoke producting material on floor 374 has reached its height level. Floor 378 will not ignite until the consumption of smoke producing material on floor 376 has reached its height level. with each of these ignition only when the prior one has burned. This process leads to a lengthy release of heat and smoke—in some cases more than 12 hours in duration.

The removable floors 374, 376, and 378 may be fixed into position and function in the way described. However, where the floors 374, 376, and 378 are removable, their removal yields a device very similar to the smoke producing device 50 described above. Use of only one or two of the removable floors 374, 376, and 378 can yield a higher initial rate of smoke production and heat release. Manipulation of the heights of the removable floors, presence of the removable floors, and amount of material in each compartment can give a wide variety of heat and smoke release characteristics. The devices of the present disclosure can be designed and/or configured in a wide variety of ways in order to achieve the desired ends of time versus intensity of smoke (or heat) produced.

Although the description above focuses on the release of smoke by a smoke producing material as an object of the disclosed embodiments, it is also true that a non-smoke producing solid fuel could be used and the various embodiments would operate to heat release for various purposes, and also in the controllable manner described for smoke production.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art.

What is claimed is:

1. A device comprising:
   an inner wall having a plurality of inner flow openings and defining a smoking chamber;
   a solid outer wall surrounding the inner wall to define a flow gap between the inner wall and outer wall;
   a top cover extending to enclose the smoking chamber and the flow gap from the top, the top cover having a solid portion covering the smoking chamber and a perforated portion defining a plurality of top openings over the flow gap providing fluid communication from the flow gap to discharge smoke from the device; and
   a bottom wall extending to enclose the smoking chamber and flow gap and enclosing the flow gap at an outer periphery of the bottom wall, the bottom wall providing a first plurality of bottom openings around the periphery thereof and under the flow gap, the first plurality of bottom openings around the periphery providing fluid communication of intake air directly into the flow gap from outside the device and through the periphery of the bottom wall.

2. The device of claim 1, wherein the bottom wall provides a second plurality of bottom openings under the smoking chamber that provide fluid communication of intake air directly into the smoking chamber from outside the device.

3. The device of claim 1, wherein the outer wall and the inner wall are cylindrical in shape.

4. The device of claim 1, wherein the outer all and inner wall are rectilinear in shape and define a one of a rectangular and square horizontal cross section.

5. The device of claim 1, further comprising a central conduit extending from the bottom wall into the smoking chamber, the central conduit in fluid communication with a central air opening in the bottom wall and defining a plurality of central openings to the smoking chamber.

6. The device of claim 1, wherein the first plurality of bottom openings range in size from about 0.06 inches to about 0.2 inches.

7. The device of claim 6, wherein a center to center distance between the first plurality of bottom openings ranges from about 0.125 inches to about 0.5 inches.

8. The device of claim 1, wherein the smoking chamber is further divided into a plurality of interior compartments by walls defining flow openings therein, each of the interior compartments abutting the flow gap and the central conduit and in fluid communication with at least one adjacent compartment.

* * * * *